Feb. 18, 1964  A. V. RICE  3,121,310
CLOSURE DEVICE
Filed Sept. 20, 1962  2 Sheets-Sheet 2

INVENTOR
ALVIST V. RICE

BY

Martha L. Rose
AGENT

3,121,310
CLOSURE DEVICE
Alvist V. Rice, Springfield, Va., assignor to Atlantic Research Corporation, Fairfax County, Va., a corporation of Virginia
Filed Sept. 20, 1962, Ser. No. 225,029
21 Claims. (Cl. 60—35.6)

This invention relates to a closure device for a gas-discharging orifice and more particularly to a removable closure device for the discharge nozzle of a rocket motor.

Generally, the type of gas-discharging orifice for which the closure device of this invention is used is the De Laval or Venturi nozzle. This type of nozzle is used on rocket motors which also, broadly, comprise a tubular casing containing a combustion chamber in which combustible propellant material is burned to produce propulsive gases. The propulsive thrust developed by such motors results from the generation of gases by ignition and burning of the propellant material within the combustion chamber and the high-velocity discharge of these gases through the nozzle.

As the development of rocket motors and their propellants has progressed, it has been found highly desirable to control the length of time required to reach equilibrium pressure in the combustion chamber. Since the ignition time characteristics of propellants are significantly affected by the combustion chamber pressure, the so-called ignition lag (the period between the starting of ignition and the reaching of equilibrium pressure) can be considerably reduced by rapidly increasing the pressure in the combustion chamber as the propellant is ignited and burned. Furthermore, it has become increasingly apparent that many propellants, if they are to operate at peak efficiency, must be protected from many environmental conditions, for example, moisture, to which the motors are subjected.

These and other desirable results can be effected by providing a closure device for the nozzle of the rocket motor. Many types of nozzle closure devices have been heretofore utilized. These may take the form of a diaphragm or plug which may be welded, brazed, soldered, cemented or otherwise secured in place within the nozzle. Such closure structures have serious disadvantages. They must be blasted from their position in the nozzle and therefore can cause thrust misalignment resulting from incomplete ejection or residual portions which have not separated from the nozzle. Furthermore, if a solid propellant is used, the flying pieces of the ruptured closure may strike the propellant and cause fracture of the grain, with resultant misfiring of the motor. The flying particles also constitute a hazard to both material and personnel. In addition it is often difficult to effect a moistureproof seal and at the same time have a closure which can be readily and completely removed from the nozzle by blasting. Other types of closure devices which are clamped in place in the nozzle and subsequently similarly removed by blasting require a relatively complex installation procedure. Finally, the previously utilized nozzle closures suffer most undesirably from an inability to be removed at an accurately predetermined pressure.

It is an object of this invention to provide an improved closure device for a gas-discharging orifice.

It is another object of this invention to provide such a closure device which forms a hermetic seal within a gas-discharging orifice such as a rocket motor nozzle.

It is a further object of this invention to provide such a closure device which can be ejected from the nozzle of a rocket motor at an accurately predetermined and reproducible pressure.

Other objects, advantages and features of this invention will become apparent from the following description and accompanying drawings.

In the drawings:
FIGURE 1 is a longitudinal cross-sectional diagrammatic view of one embodiment of the closure device of this invention inserted in the nozzle of a rocket motor.

In accordance with my invention, I have discovered a closure device which, when inserted in a gas-discharging orifice such as the nozzle of a rocket motor, will operate as a hermetic seal and which can be ejected from the nozzle at an accurately reproducible and predetermined pressure.

In general the closure device of my invention comprises a member having a resilient (elastic), enlarged forward portion which abuts the inside surface of the convergent section of a Venturi type nozzle adjacent to the throat section or the inside surface of both the convergent section and the throat section of the nozzle. The forward portion is connected to an enlarged rearward or aft portion by a neck portion which is substantially smaller in diameter than either the forward or rearward portions. The rearward portion of the member is enlarged so as to abut the inside surface of the divergent part of a Venturi type nozzle. The closure member is a unitary structure which can be formed from a single piece of continuous material or can be produced in separate forward and rearward portions which can then be connected in any suitable manner. Preferably the closure device is a single continuous member.

Figure 1:
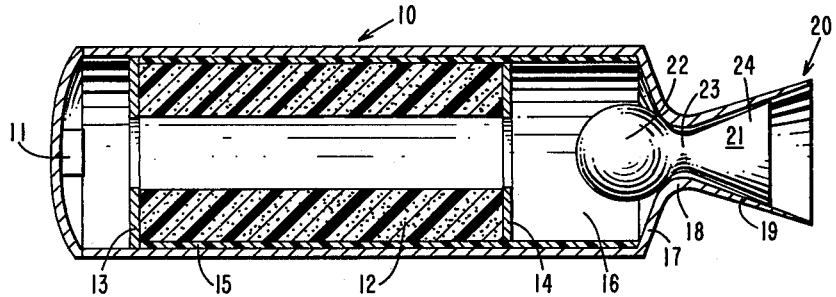

Referring now to FIGURES 1–5 of the drawings, in FIGURE 1, a rocket motor, indicated generally at 10, having igniter 11, propellant grain 12, grain supports 13 and 14, insulation 15, combustion chamber 16 and convergent section 17, throat 18 and divergent section 19 of nozzle 20 is equipped with a closure device, indicated generally at 21, comprising an enlarged, resilient forward portion 22, neck 23 and an enlarged, resilient lower portion 24.

Figure 5:
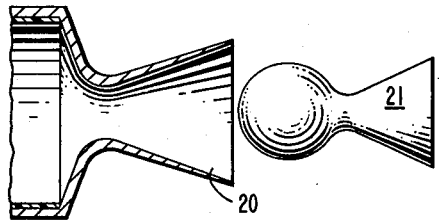

In FIGURES 2–5, closure member 21 is shown being ejected from nozzle 20 in sequential steps from sealing position (FIGURE 2) through complete ejection (FIGURE 5).

Figure 15:
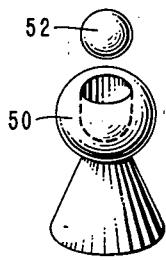
FIGURES 15 and 16 are exploded elevational views representing two additional modifications of the upper portion of the closure device of this invention.
Figure 16:
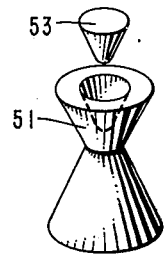

The shape of the resilient forward portion of my closure device can be of any configuration so long as it can be inserted through the constricted throat section of the nozzle in which it is installed and can bear circumferentially against at least a part of the inner surface of the convergent section of the nozzle adjacent to the throat section or both the convergent section and the throat section of the nozzle in a substantially air-tight relationship. The circumferential portion against which the resilient forward portion of the closure device bears can be an entire annular part of the inner surface of the convergent section of the nozzle adjacent to the throat or both the convergent section and the throat section. By an entire annular part is meant that section between two planes intersecting the inner surface and lying substantially perpendicular to the longitudinal axis of the nozzle. This resilient forward portion can be solid and in the form of a sphere, cylinder, cone, etc., as illustrated in FIGURES 6–10, numerals 22 and 30—33, respectively, or it can be hollow or recessed, as shown in FIGURES 15 and 16, numerals 50 and 51, respectively, in which case rigid form-fitting inserts, numerals 52 and 53, respectively, can be placed inside so as to increase the composite compression modulus thereby necessitating greater internal pressures to effect closure ejection. Preferably, the shape of the forward portion is a sphere because of its symmetrical geometry and uniform surface curvature.

The enlarged rearward portion of the closure device of this invention can have any shape as long as it engages the inside surface of the divergent section of a nozzle in such a manner as to exert, on the forward portion of the closure device, a force sufficient to pull this forward portion into air-tight contact with the inside surface of the convergent section of the nozzle adjacent to the throat section or the inside surfaces of both the convergent section and the throat section. The rearward portion can take the shape of a sphere, truncated cone, etc., as illustrated in FIGURES 6 and 11–14, numerals 24 and 40—43, respectively. It forms a unitary structure with the forward portion which can be produced from a single piece of continuous material or it can be produced separately and joined to the forward portion in any suitable manner in the region of the neck. If the rearward portion is made separately from the forward portion, it can be resilient or it can be rigid, as for example, wood or metal. Preferably the rearward portion of the closure device of this invention is a resilient cone having sides flaring at a greater angle relative to the longitudinal axis than the angle subtended by the flaring sides of the divergent section of the nozzle. Since the angle of the divergent conical rearward portion of the closure device is greater, a constant force is generated in the rearward direction holding the forward portion in tension against the inside surface of the convergent section of the nozzle adjacent to the throat section or the inside surface of both the convergent section and the throat section, forming a positive air-tight seal in that area. A secondary seal is also effected near the base of the cone where it is under greatest compression.

The neck region of the closure device can be of any desirable shape as long as it does not interfere with the engagement of the forward or rearward portions of the closure device with the inside surfaces of the nozzle. Therefore, the neck is necessarily of a smaller diameter than either the forward or rearward portions. This permits the forward portion of the closure device to seat itself with an easily ascertainable "pop" or "snap." This "pop" or sudden forward movement during insertion is occasioned by the expansion of the forward portion of the closure device against the inside surface of the convergent section of the nozzle after it has been compressed by the throat section of the nozzle. The sudden forward movement is limited by the engagement of the rearward portion of the closure device against the divergent section of the nozzle. Therefore, in any given size and shape of closure device and nozzle into which it is inserted, the engagement of the forward portion and rearward portion of the closure device with the inside surfaces of the nozzle provides a self-regulating mechanism enabling the closure device to seat itself in the same position regardless of the force or method of insertion. This essentially automatic seating reproducibility has the highly desirable advantage of providing an accurately reproducible ejection pressure.

As aforementioned and as can be seen from the many illustrations, the closure device of my invention is a unitary member which can be formed from a single piece of continuous material, as preferable, or it can be produced in two or more sections which can be connected in any desired manner. The essential features of this closure device are its ability to seat itself in an accurately reproducible position in the nozzle into which it is inserted and the formation of an air-tight seal at least between the forward portion of the closure device and the inside surface of the convergent section adjacent to the throat section of the nozzle or the inside surfaces of both the convergent section and throat section.

Generally, the closure device of my invention, if formed from a single piece of continuous material, can be made of any resilient (elastic) material which will deform sufficiently to permit the passage of the enlarged forward portion through the throat of the nozzle into which it is inserted. If it is made up of two or more separate sections joined together, then only the enlarged forward portion comprises a resilient material although preferably, the enlarged rearward portion is also resilient. It is essential only that such materials are sufficiently resilient and have a sufficiently high tensile strength to deform without tearing or fracturing during insertion of the closure device into a nozzle and to recover substantially their original shape after installation is complete. The latter characteristic is sometimes referred to as a substantially complete elastic memory. These materials are of sufficient hardness to prevent deformation to the extent necessary to permit ejection prior to reaching the desired internal pressure. Such materials which can be used for purposes of this invention have a Shore A Durometer hardness of from about 10 to about 100 and preferably about 30 to about 60 as determined under A.S.T.M. D676–59T. There may be used, for example resilient synthetic elastomers such as silicone rubbers, e.g., phenyl vinyl dimethylsiloxane polymers and methyl siloxane polymers; substituted silicone rubbers, e.g., fluorinated phenyl vinyl dimethylsiloxane polymers; vulcanized and unvulcanized rubbery hydrocarbon polymers, e.g., copolymers of a major proportion (about 98%) of an ethylenically unsaturated monomer such as isobutene and a small proportion (about 2%) of a diene monomer such as isoprene or butadiene (butyl rubber), butadiene-styrene copolymers; vulcanized and unvulcanized substituted rubbery hydrocarbon polymers, e.g., polychloroprene; vulcanized copolymers of butadiene and acrylonitrile; vulcanized copolymers of 95% ethyl acrylate and 5% chloroethyl vinyl ether and polyurethane rubbers. Natural polymers such as natural rubber, e.g., vulcanized Hevea rubber, can also be used. Because of their excellent physical properties, particularly temperature insensitivity and high tensile strength, the preferred materials are the silicone and fluorosilicone rubbers.

Other ingredients such as fillers or pigments, e.g., carbon black, zinc oxide, magnesium carbonate, barium sulfate, etc.; stabilizers, e.g., naphthyl amines, etc.; can be added to the elastomers used in the production of my closure device, it merely being necessary that the final composition has the aforementioned requisite qualities of resiliency and hardness to form a suitable final product.

Preferably, in order to enhance the hermetic seal and decrease the frictional force between my closure device and the nozzle into which it is inserted, it is highly advantageous to coat at least the enlarged forward portion with a lubricating compound. The reduction in the amount of friction between the closure device and the nozzle permits an even more accurately reproducible and predetermined blowout pressure. Any compound, which retains its lubricating and sealing properties under the operational and environmental conditions to which it is exposed can be used. Examples of such lubricants are silicone greases, e.g., a composition of lithium stearate soap and a methyl phenyl siloxane oil and a composition of colloidal $SiO_2$ and dimethyl siloxane oil; graphite, molybdenum disulfide, etc.

The nozzle closures of this invention can be produced in any convenient manner such as molding in a preformed dye, machining to shape from a block, etc. If the closure device is produced in several parts, as for instance, by molding, these can be joined together in any desirable manner such as with adhesives, etc.

Figure 2:
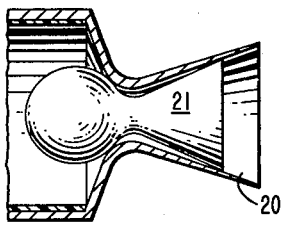
FIGURES 2–5 are longitudinal cross-sectional diagrammatic views depicting the ejection of the same embodiment of the closure device from a nozzle.
Figure 3:
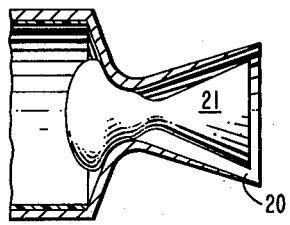
Figure 4:
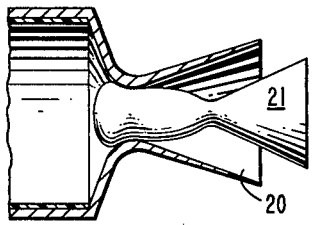

One of the more highly desirable features of my closure device is its ease of installation and operation in the orifice or nozzle in which it is inserted. Installation comprises inserting the closure device, as by hand or with a hydraulic ram, into the open, rearward divergent end of the nozzle until the enlarged forward portion is seated on the inside surface of the convergent section of the nozzle adjacent to the throat section or on the inside surface of both the convergent section and the throat section under constant tension. The final installed position of the closure device is shown in FIGURES 1 and 2. After the closure device has been fully inserted into the nozzle it will effect a hermetic seal until it is ejected by an increased pressure inside the rocket motor. The pressure required to expel the closure must be of such low magnitude as to avoid hindrance to normal functioning of the motor, yet sufficiently high to provide for increased internal chamber pressurization for the desired time. Upon firing of the rocket motor, the enlarged upper portion becomes more firmly seated on the throat until the internal pressure is great enough to distort the upper portion to the extent necessary to force it through the throat. The internal combustion chamber pressure at which the closure device will be ejected can be accurately predetermined from the geometry of the nozzle closure, the coefficient of friction between the closure device and the inside surface of the nozzle and the hardness of the composition from which the closure device is produced. Thus, an exceedingly important advantage of my closure device is the accuracy and reproducibility with which it can be predesigned for ejection at a desired pressure over a wide range of pressures.

In order to demonstrate the highly advantageous characteristics of my closure device, the following specific tests were performed.

*Reproducible Ejection Pressure Tests*

Figure 6:
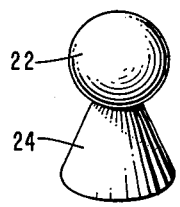
FIGURE 6 is an elevational view of the closure device of FIGURES 1–5.
Figure 7:
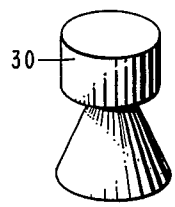
FIGURES 7–10 are elevational views showing modifications of the upper portion of the closure device of this invention.
Figure 8:
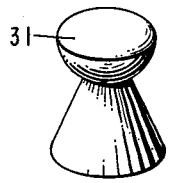
Figure 9:
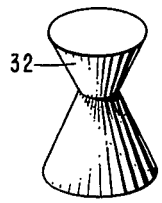
Figure 10:
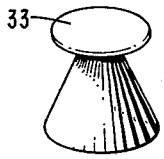
Figure 11:
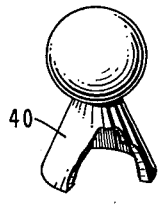
FIGURES 11–14 are elevational views showing modifications of the lower portion of my closure device.
Figure 12:
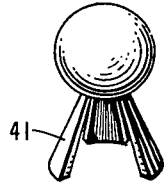
Figure 13:
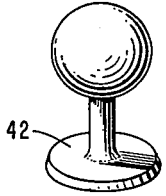
Figure 14:
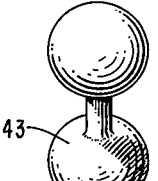

A closure device, as illustrated in FIGURE 6, comprising Dow Corning RTV-502, a composition of a rubbery methyl siloxane polymer and silica filler, was formed using standard molding procedures. The closure device was coated with a lubricant composition, Dow Corning #33 grease, which comprises a methyl phenyl siloxane oil gelled with lithium stearate. The closure plug was then inserted into the nozzle of a test rocket chamber which was connected to a source of nitrogen gas. The nitrogen gas was caused to flow into the chamber increasing the internal pressure at the rate of 10 p.s.i. per second. The closure plug was ejected at an internal pressure of 50 p.s.i. This procedure was repeated two more times using the same test nozzle and closure. In each case the internal ejection pressure was also 50 p.s.i.

The aforementioned procedure was repeated using a second nozzle and a second plug. The plug was ejected at an internal chamber pressure of 90 p.s.i. In each of two additional tests, the same closure plug was ejected from the nozzle at an internal pressure of 90 p.s.i.

The third closure device, similar to the shape of the one illustrated in FIGURE 6, but composed of Dow Corning's Silastic 651, a composition of a methyl vinyl phenyl siloxane polymer filled with silica and red iron oxide, was coated with the above-mentioned lubricant and subjected to the same procedure. Five tests using the same closure plug and nozzle were performed with the plug being ejected in each instance at an internal chamber pressure of between 40 and 44 p.s.i.

*Helium Leak Rate Test*

A closure device of the same type as used in the previous ejection pressure tests was inserted into the nozzle of a test rocket. The combustion chamber of the rocket was connected to a source of helium gas. The exhaust end of the nozzle was connected to a Veeco MA-9AB Mass Spectrometer Leak Detector, a commercial device which is used to detect helium atoms. The combustion chamber was flooded with helium gas under a pressure of 5 p.s.i. and a vacuum was applied to the exhaust end of the nozzle in order to draw any helium atoms which might escape around the closure device through the Leak Detector. At ambient temperature, the Leak Detector could measure no helium atoms escaping around the sealed nozzle. Since the Leak Detector has a sensitivity of $6.5 \times 10^{-8}$ cc./sec., any helium leaking from the combustion chamber was doing so at a rate slower than $6.5 \times 10^{-8}$ cc./sec. For all practical purposes, this amounts to a leak-proof seal. Two similar closure devices were inserted into two additional rocket nozzles and the test was repeated. In each case, the Leak Detector could measure no helium atoms escaping around the sealed nozzle.

The test was repeated at a temperature of 170° C. using the same three closure devices and rockets. The average leak rate of these three runs was $37.3 \times 10^{-8}$ cc./sec. Again, for practical purposes this value is so low as to amount to a leak-proof seal.

The design of the closure device of this invention is not limited to those illustrated, since it is obvious that many more suitable shapes, produced from many additional resilient compositions can be used for particular applications. These types of closure devices can be used with solid, semi-solid or liquid fueled rocket motors, although they find their most extensive use in solid propellant motors.

In addition to those already enumerated, other advantages of my closure device for use with rocket motor nozzles are realized. Material and production costs are reduced. There is a substantial reduction in the weight of the closure device. The ejection pressure is substantially insensitive to temperature change. Furthermore, typical closure devices of my invention protect the internal structures of the rocket motor from moisture, salt spray, fungus, and other contamination and permit storage at -65° F. to 160° F. for five years or more. These and many other highly desirable results innure from the use of the new and greatly improved closure devices of this invention.

As will be apparent to those skilled in the art, various other modifications can be carried out from the above disclosure without departing from the spirit and scope of the invention embodied within the claims.

I claim:

1. A closure device comprising a pressure build-up, blow-out plug adapted to be seated within a convergent-divergent nozzle comprising:
    (a) a forward portion shaped to bear circumferentially against a portion of the inner surface of the convergent section of said nozzle adjacent the throat section of said nozzle in air-tight relationship therewith, said forward portion being larger than said nozzle throat section and being formed of a resilient material, said resilient material being sufficiently rigid to permit a predetermined pressure to form on the convergent side of said nozzle the exceeding of which causes ejection of said plug from said nozzle.
    (b) a rearward portion shaped to bear against the divergent section of said nozzle to retain said forward portion in said air-tight relationship with said portion of said convergent section, and
    (c) a neck portion of lesser diameter than either said forward or said rearward portions.

2. The closure device of claim 1 in which said resilient forward portion is shaped to bear circumferentially against against the convergent section of said nozzle adjacent to said throat section and against said throat section.

3. The closure device of claim 1 in which said member is comprised of a single piece of continuous material.

4. The closure device of claim 3 in which said forward portion is a sphere.

5. The closure device of claim 3 in which said rearward portion is a resilient cone.

6. The closure device of claim 1 in which said member comprises a separate forward portion and a separate rearward portion which are connected to form a single unitary structure.

7. The closure device of claim 1 in which said forward portion comprises a major proportion of a resilient, elastomeric organic polymer.

8. The closure device of claim 3 in which said member comprises a major proportion of a resilient, elastomeric organic polymer.

9. The closure device of claim 1 in which said forward portion is coated with a lubricant.

10. The closure device of claim 3 in which said member is coated with a lubricant.

11. In a reaction propulsion device comprising:
 (a) a combustion chamber and
 (b) a convergent-divergent nozzle attached to said combustion chamber,
 (c) the improvement in which the closure device of claim 1 is positioned in said convergent-divergent nozzle.

12. The closure device of claim 11 in which the said resilient forward portion is shaped to bear circumferentially against the convergent section of said nozzle adjacent to said throat section and against said throat section.

13. The closure device of claim 11 in which said member is comprised of a single piece of continuous material.

14. The closure device of claim 13 in which said forward portion is a sphere.

15. The closure device of claim 13 in which said rearward portion is a resilient cone.

16. The closure device of claim 11 in which said member comprises a separate forward portion and a separate rearward portion which are connected to form a single unitary structure.

17. The closure device of claim 11 in which said forward portion comprises a major proportion of a resilient, elastomeric organic polymer.

18. The closure device of claim 13 in which said member comprises a major portion of a resilient, elastomeric organic polymer.

19. The closure device of claim 11 in which said forward portion is coated with a lubricant.

20. The closure device of claim 13 in which said member is coated with a lubricant.

21. The closure device of claim 1 wherein said forward portion has an initial shape prior to insertion within said nozzle, said forward portion resuming substantially said initial shape when inserted within said nozzle.

References Cited in the file of this patent

UNITED STATES PATENTS

| | | |
|---|---|---|
| 1,949,058 | Leguillon | Feb. 27, 1934 |
| 3,077,734 | Adelman | Feb. 19, 1963 |